(12) United States Patent
Joyce

(10) Patent No.: US 6,318,943 B2
(45) Date of Patent: *Nov. 20, 2001

(54) V TYPE NAIL

(76) Inventor: Barry James Joyce, The Brackens, Rayners Avenue, Loudwater, High Wycombe, Buckinghamshire, HP10 9SL (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/333,100

(22) Filed: Jun. 15, 1999

(30) Foreign Application Priority Data

Jun. 16, 1998 (GB) .................................................. 9812883

(51) Int. Cl.⁷ ...................................................... F16B 15/00
(52) U.S. Cl. ............................................................ 411/478
(58) Field of Search ................................... 411/478, 477, 411/461

(56) References Cited

U.S. PATENT DOCUMENTS

| | | | |
|---|---|---|---|
| 3,431,810 | * | 3/1969 | Black . |
| 3,898,906 | * | 8/1975 | Greenberg . |
| 4,681,498 | * | 7/1987 | Raffoni . |
| 5,193,959 | * | 3/1993 | Motta . |

* cited by examiner

*Primary Examiner*—Flemming Saether
(74) *Attorney, Agent, or Firm*—Mitchell Silberberg & Knupp LLP

(57) ABSTRACT

A V type nail has two side portions, at least a part of each side portion being outwardly tapered from the driven end to the leading or cutting edge thereof so as to act on woodwork or other suitable material as it is driven therein at a joint and thus obtain and maintain a tight joint.

9 Claims, 1 Drawing Sheet

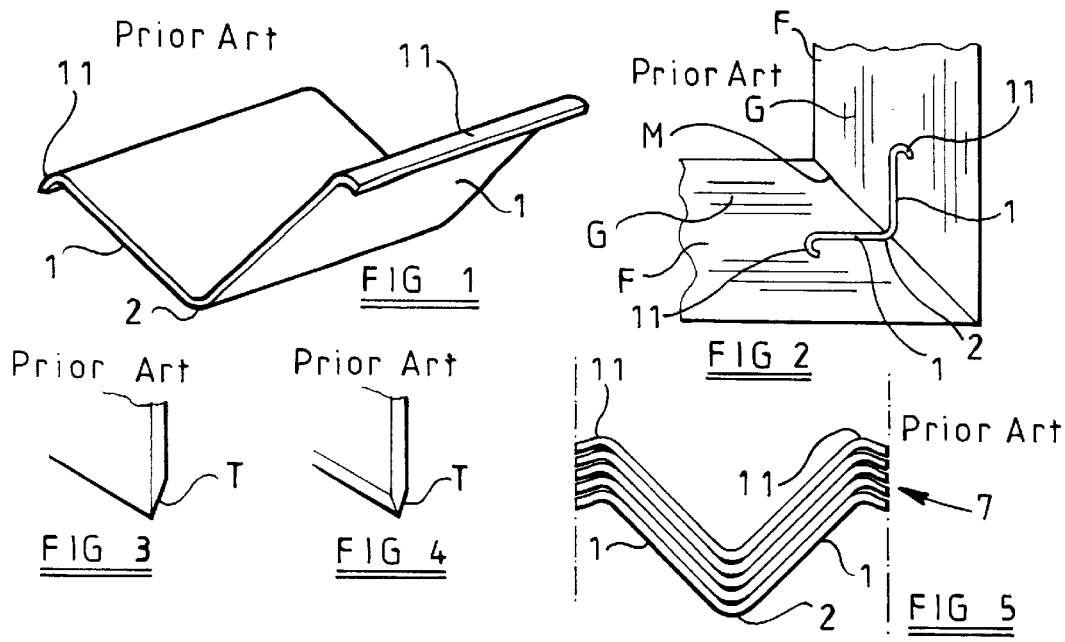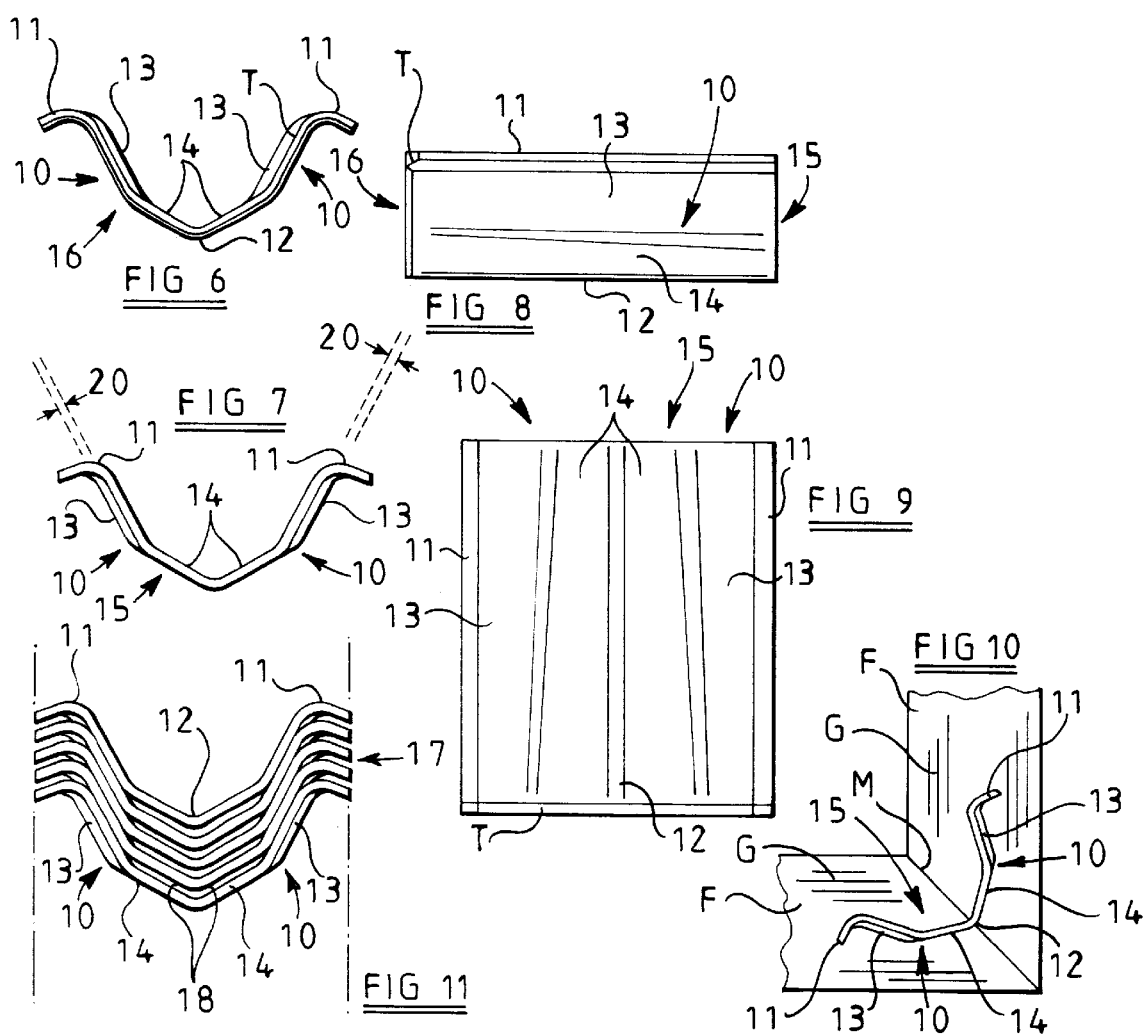

V TYPE NAIL

BACKGROUND OF THE INVENTION

1. FIELD OF THE INVENTION

This invention relates to V type nails or wedge fasteners as used for joining purposes especially, but not exclusively, for securing wooden frame members of picture or similar frames i.e. at mitre joints between the frame members. Various other uses of the nails arise generally in woodwork and joinery.

2. DESCRIPTION OF THE RELATED ART

As currently used and shown in FIGS. 1 and 2 of the accompanying drawings such V nails are made of thin sheet steel and provide two diverging sides portions 1 about an included angle of 90 degrees or thereabouts, the outer edges of the side portions being outwardly flanged in a curved manner at 11. The side portions 1 at one end of the nail are sharpened to provide cutting edges to enable the nail to be driven into woodwork in the manner shown in FIG. 2.

Hitherto the practice has been to provide at least two kinds of nail, one suitable for softwood and the other for hardwood. For softwood the single sided cutting edge is as shown in FIG. 3 and the double sided edge of FIG. 4 is for hardwood. In each case and as the nail is driven into abutting frame as like members F e.g. at a mitre joint M (FIG. 2) the action of the taper cutting edges T is to draw the frame members tightly together at the joint. In the case of the nail for hardwood use such drawing together action is augmented by controlled outward flaring or the opening deformation of the sides 1 of the nail.

As shown in FIG. 5, the nails may be provided in detachably adhered stick form 7 for convenient use such as by power driven hammer operation.

SUMMARY OF THE INVENTION

The object of the present invention is to provide an improved dual purpose form of V nail capable of effective use in both softwood and hardwood. A further object is to enable the nails to be readily driven into position with especial advantage as regards power tool operation. These and other practical advantages will be apparent from the following description.

According to the invention a V type nail is characterised by at least part of each side portion of the nail being outwardly tapered from the driven end to the leading or cutting edge end thereof so as to act on woodwork or other suitable material as it is driven therein at a joint and thus obtain and maintain a tight joint.

The leading or cutting edge end is preferably sharpened to an unequal double sided edge configuration as for hardwood.

Tapered outer parts of the side portions of the nail may be about a lesser included angle than that between inner parts of the side portions at their V form junction.

BRIEF DESCRIPTION OF THE DRAWINGS

A practical example of V type nail according to this invention is shown in the further accompanying drawings in which:

FIG. 1 is a is a perspective view of a prior art nail.

FIG. 2 is an end view of the nail of FIG. 1 in a position of use.

FIG. 3 is a view of a cutting edge of the nail of FIG. 1.

FIG. 4 is a view of an alternate cutting edge for the nail of FIG. 1.

FIG. 5 is a plan view of a stick of the nails of FIG. 1 ready for use.

FIGS. 6 and 7 are respectively a leading cutting edge end view and a rear driven end view of the nail.

FIG. 8 is a side elevation.

FIG. 9 is a plan view of a stick of the nails ready for use.

FIG. 10 is an end view of the nail in position of use.

FIG. 11 is a plan view of a stick of the nails ready for use.

DESCRIPTION OF THE PREFERRED EMBODIMENTS

Like parts are referred to by the same or similar reference numerals throughout the drawings whilst any dimensions or angle values are given by way of example only and may be varied according to requirements. For clarity the drawings are generally shown on a somewhat enlarged scale since typically in practice the nail maybe of the order of 10 mm wide by 5 mm to 15 mm long, typically 5, 7, 8, 10, 12 or 15 mm long.

Referring to the drawings the nail is produced from thin sheet steel e.g. 0.3 mm thick and is formed to a general V form so as to provide two outwardly diverging side portions 10 from the V junction 12. The outer edges of the side portions 10 are outwardly flanged at 11 in the usual manner.

For the purpose of this invention an outer part 13 of each side portion 10 is outwardly tapered from the rear or driving end 15 of the nail to the leading or cutting edge end 16. In order to enable this to be achieved and the V junction retained, the outer parts 13 are mutually inclined about a lesser included angle (e.g. 60 degrees) than that of the inner parts 14 which latter provide the V junction 12. The included angle in the case of the inner parts 14 maybe of the order of 120 degrees.

The profiles of the rear end and the leading end of the nails are ideally the same for the different lengths of nail with the offset 20 of the leading to the rear end being 0.3 mm. The result is a varying angle of taper from the rear end to the leading end as shown in Table I below.

TABLE I

| Nail length (mm) | taper angle |
| --- | --- |
| 5 | 3.43° |
| 7 | 2.45° |
| 8 | 2.15° |
| 10 | 1.72° |
| 12 | 1.43° |
| 15 | 1.15° |

The cutting edges T at the leading end are preferably of double sided edge form (as per FIG. 4) so as to be suitable for both softwood and especially hardwood.

As the nail is driven into position of use at a mitre joint M the mutual taper of the outer side parts 13 presses against the adjacent wood and thrusts the inclined ends of the frame members F firmly together at the mitre joint M so that a tight joint is obtained and maintained.

In the case of softwood little or no deformation of the nail occurs but as regards hardwood the much higher resistance of the latter against the cutting edges causes some opening out or flaring of the nail. However this is controlled or counteracted by the taper action to maintain a tight joint.

The angled formation of the side portions 10 and the tapering of the outer parts 13 is such that they lie slightly across the grain G of the frame members F which assists in obtaining a tight joint (see FIG. 10).

The form and arrangement of nail according to this invention also provides a further practical advantage where the nails are provided or collated in stick form 17 (FIG. 11) from which they are individually picked off and driven into position of use especially by a power tool such as a pneumatic hammer.

With conventional V nails as referred to above with reference to FIGS. 1 to 5 the collated nails 7 (FIG. 5) nestle together in intimate full face contact which presents a problem when picking off individual nails. This has been overcome by using a driving hammer head of corresponding but thinner form than the nail which means that only a hammer head of low strength can be employed. An alternative procedure has been to use a more robust hammer head but in order to allow for manufacturing tolerances and to avoid inadvertently catching the next nail in the stick 7, only restricted engagement of the head with the driving end of the nail is possible e.g. of the order of 85% contact.

However the taper form of the side parts 13 of the nail in accordance with this invention results in the collated nails in a stick 17 being spaced apart by a gap 18 between the side parts 14. This enables a hammer head of adequate strength and suitable profile to be employed so as to fully contact the driving end of the nail i.e. with as much as 100% contact engagement and without fouling an adjacent nail in the stick 17. Indeed the hammer head may slightly extend beyond full contact with the nail end i.e. partially over the gap 18.

As will be apparent from the foregoing the nail provides a number of significant practical advantages whilst various modifications maybe made to it within the scope of the invention herein defined.

What is claimed is:

1. A nail for joining frame members, said nail comprising:
   a first side portion having an outer part and an inner part; and
   a second side portion having an outer part and an inner part,
   wherein the inner part of said first side portion and the inner part of said second side portion meet at a first junction and are inclined to one another, generally forming a V shape, the V shape defining an interior space that is partially enclosed by the V and an exterior space that is outside of the V,
   wherein each of said first side portion and said second side portion has an inside surface along the interior space defined by the V and an outside surface along the exterior space,
   wherein the inner part and the outer part of said first side portion meet at a second junction,
   wherein the inner part and the outer part of said second side portion meet at a third junction,
   wherein the inside surfaces of the inner part and the outer part of said first side portion form an angle of less than 180 degrees, and
   wherein the inside surfaces of the inner part and the outer part of said second side portion form an angle of less than 180 degrees.

2. A nail according to claim 1, wherein each of said first side portion and said second side portion has a cutting end and a driving end, and wherein the outer parts of said first side portion and said second side portion are tapered outwardly of one another from the driving end to the cutting end.

3. A nail according to claim 2 wherein an angle of taper of the outer parts from the driving end to the cutting end is between 1.15° and 3.43°.

4. A nail according to claim 2 wherein an angle of taper of the outer parts is dependent upon a length of said nail between the driving end and the cutting end.

5. A nail according to claim 1 wherein outer edges of each of said first side portion and said second side portion are outwardly flanged.

6. A nail according to claim 1 wherein the inside surfaces of the inner parts of said first side portion and said second side portion form an angle of approximately 120 degrees.

7. A nail according to claim 1 wherein, for each of said side portions, the inside surface of the inner part forms an angle of approximately 60 degrees with the inside surface of the outer part.

8. A nail according to claim 1 wherein said nail is formed from sheet steel so as to provide said first side portion and said second side portion.

9. A nail according to claim 1 wherein a first angle formed between the inner parts of said first side portion and said second side portion and a second angle formed between the inner parts and the outer parts are selected such that when said nail is stacked with identical nails, a gap exists between adjacent vertices.

* * * * *